United States Patent
Maekawa et al.

(10) Patent No.: US 9,899,885 B2
(45) Date of Patent: Feb. 20, 2018

(54) ROTOR AND ROTATING ELECTRIC MACHINE

(71) Applicant: DENSO CORPORATION, Kariya, Aichi-pref. (JP)

(72) Inventors: Takeo Maekawa, Kariya (JP); Keiji Kondou, Kariya (JP); Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 14/870,567

(22) Filed: Sep. 30, 2015

(65) Prior Publication Data
US 2016/0094098 A1 Mar. 31, 2016

(30) Foreign Application Priority Data
Sep. 30, 2014 (JP) .................................. 2014-200242

(51) Int. Cl.
*H02K 1/27* (2006.01)
*H02K 1/28* (2006.01)

(52) U.S. Cl.
CPC .................. *H02K 1/27* (2013.01); *H02K 1/28* (2013.01); *H02K 2201/06* (2013.01)

(58) Field of Classification Search
CPC ......... H02K 1/28; H02K 1/27; H02K 2201/06
See application file for complete search history.

(56) References Cited

U.S. PATENT DOCUMENTS

| 4,942,324 A * | 7/1990 | Ooyama ................... H02K 1/26 310/216.007 |
|---|---|---|
| 2004/0145248 A1* | 7/2004 | Jung ......................... H02K 1/27 310/15 |
| 2005/0179334 A1* | 8/2005 | Yoshinaga .............. H02K 21/14 310/156.47 |
| 2006/0181173 A1 | 8/2006 | Takahashi et al. |
| 2013/0119789 A1* | 5/2013 | Maekawa .............. H02K 19/24 310/46 |
| 2013/0187505 A1* | 7/2013 | Senoo ................... H02K 1/2773 310/156.08 |

(Continued)

FOREIGN PATENT DOCUMENTS

| JP | 2001-057748 A | 2/2001 |
|---|---|---|
| JP | 2002-186227 A | 6/2002 |

(Continued)

*Primary Examiner* — Mohamad Musleh
(74) *Attorney, Agent, or Firm* — Oliff PLC

(57) ABSTRACT

A rotor includes a rotor core and permanent magnets. The rotor core includes annular bodies that are stacked in a stacking direction and each formed of core segments arranged along a circumferential direction. The number of the core segments in each of the annular bodies is set based on k, where k is the number of magnetic poles formed by the permanent magnets. The rotor core has n through-holes, where n≥k. The rotor further includes n fixing members each of which extends in the stacking direction through one corresponding through-hole of the rotor core. Between each circumferentially adjacent pair of the core segments, there is formed a gap that is greater than a clearance provided between the through-holes of the rotor core and the fixing members. At least one of the annular bodies is circumferentially offset from another annular body by an integer multiple of one magnetic pole.

11 Claims, 16 Drawing Sheets

(56) References Cited

U.S. PATENT DOCUMENTS

| | | | |
|---|---|---|---|
| 2014/0035420 A1* | 2/2014 | Li | H02K 1/274 |
| | | | 310/156.47 |
| 2015/0270750 A1* | 9/2015 | Totoki | H02K 1/276 |
| | | | 310/156.25 |

FOREIGN PATENT DOCUMENTS

| | | |
|---|---|---|
| JP | 2002-262496 A | 9/2002 |
| JP | 2006-230087 A | 8/2006 |

* cited by examiner

ROTOR AND ROTATING ELECTRIC MACHINE

CROSS-REFERENCE TO RELATED APPLICATION

This application is based on and claims priority from Japanese Patent Application No. 2014-200242 filed on Sep. 30, 2014, the content of which is hereby incorporated by reference in its entirety into this application.

BACKGROUND

1. Technical Field

The present invention relates to a rotor which includes a rotor core formed into a predetermined shape by arranging in a circumferential direction and stacking in a stacking direction a plurality of core segments, and to a rotating electric machine which includes the rotor.

2. Description of Related Art

Conventionally, in consideration of centrifugal force, rotors for rotating electric machines generally employ cores that are formed into one piece by, for example, blanking.

On the other hand, there is disclosed, for example in Japanese Patent Application Publication No JP2002262496A, a rotor core that is formed of core segments and designed to withstand centrifugal force. More specifically, the rotor core includes a plurality of cylindrical cores. Each of the cylindrical cores is formed by stacking a plurality of annular cores. Each of the annular cores is formed by arranging in a circumferential direction a plurality of fan-shaped core segments that have protrusions and recesses formed in circumferential end surfaces thereof and fitting each of the protrusions into a corresponding one of the recesses to form one protrusion-recess fitting portion. Moreover, the cylindrical cores are stacked so that the protrusion-recess fitting portions in any of the cylindrical cores are circumferentially offset from those in another of the cylindrical cores.

However, with the above configuration, the roundness (e.g., the inner and outer diameters) of the rotor core depends on the positional accuracy (or fitting accuracy) of the protrusion-recess fitting portions. Therefore, increasing the roundness of the rotor core will result in an increase in the manufacturing cost as well as an increase in the maintenance cost of dies. Moreover, when the core segments are formed at high accuracy, the fit between the protrusions and the recesses is close to interference fit. Therefore, it is not easy to perform the assembly process of the rotor core.

On the other hand, when the core segments are formed at low accuracy, the coaxiality of the rotor core with a stator is low. Therefore, it is inevitable to increase the size of an air gap provided between the rotor core and the stator, thus lowering the performance of the rotating electric machine.

SUMMARY

According to exemplary embodiments, there is provided a rotor which includes a rotor core and a plurality of permanent magnets provided in the rotor core. The rotor core includes a plurality of annular bodies that are stacked in layers in a stacking direction. Each of the annular bodies is comprised of a plurality of core segments that are made of a magnetic steel sheet and arranged along a circumferential direction of the rotor core. The number of the core segments in each of the annular bodies is set based on k, where k is a natural number representing the number of magnetic poles formed by the permanent magnets. The rotor core has a through-holes formed therein, where n is a natural number greater than or equal to k. The rotor further includes n fixing members each of which extends in the stacking direction through a corresponding one of the through-holes of the rotor core so as to fix the rotor core to a fixed member. Between each circumferentially adjacent pair of the core segments, there is formed a gap that is greater than a clearance provided between the through-holes of the rotor core and the fixing members. At least one of the annular bodies is circumferentially offset from another of the annular bodies by an integer multiple of one magnetic pole.

With the above configuration, there are the gap formed between each circumferentially adjacent pair of the core segments and the clearance provided between the through-holes of the rotor core and the fixing members. With the gap and the clearance, the tolerances in forming the core segments and the deviations in assembling the core segments and in fixing the rotor core to the fixed member by the fixing members can be absorbed. Therefore, it is possible to easily perform the assembly process of the rotor core by arranging and stacking the core segments along a jig whose coaxiality is ensured. Consequently, it is possible to reduce the time and effort for performing the assembly process.

Moreover, with the gap and the clearance, it is possible to secure high roundness and thus high coaxiality of the rotor core only by assembling the core segments along the shape of the jig. Consequently, with the high coaxiality of the rotor core (or the rotor), it is possible to minimize the air gap between the rotor and a stator to be disposed in radial opposition to the rotor.

Furthermore, with the clearance less than the gap, when any circumferentially adjacent pair of the core segments are both deviated toward the gap therebetween, the circumferential end surfaces of the pair of the core segments are prevented from making contact with each other. Consequently, it is possible to prevent the core segments from being deformed due to contact therebetween, thereby making it possible to accurately assemble the core segments.

In addition, with the above configuration, it is possible to improve the material yield of the rotor core in comparison with the case of forming a rotor core into one piece by, for example, blanking. Moreover, it is also possible to reduce the sizes of dies used for forming the core segments. Consequently, it is possible to reduce the manufacturing cost of the rotor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
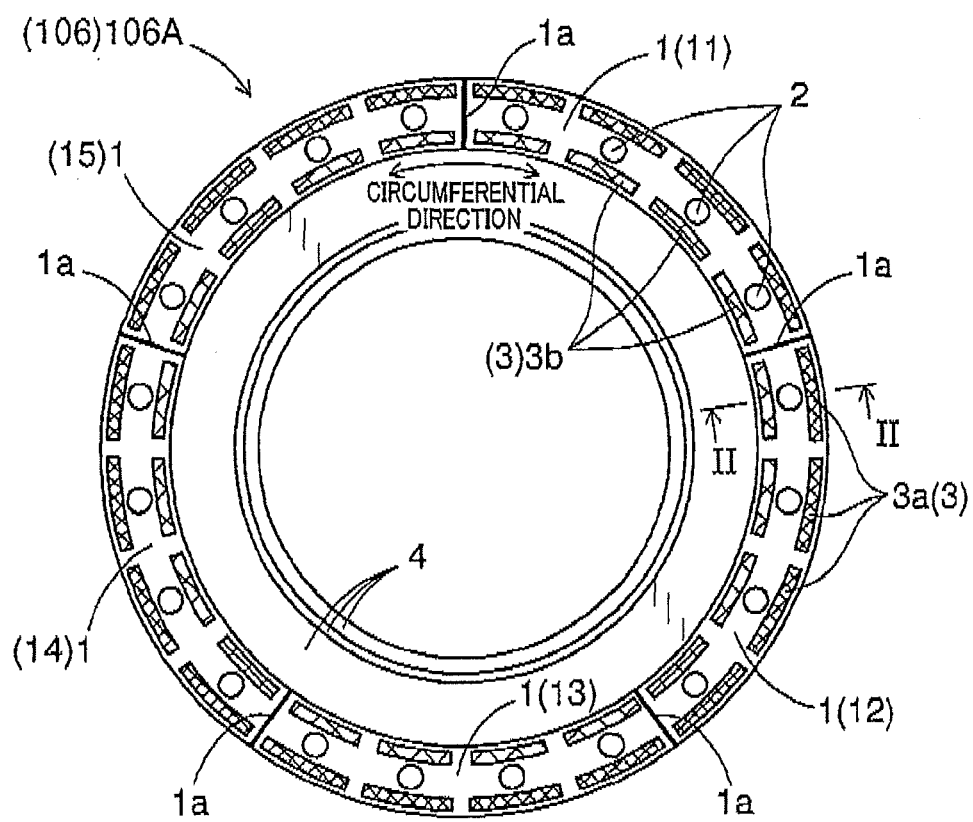
FIG. 1 is a schematic plan view illustrating a first configuration example of a rotor core.

Exemplary embodiments will be described hereinafter with reference to FIGS. 1-26. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

A first exemplary embodiment will be described hereinafter with reference to FIGS. 1-14.

Figure 2:
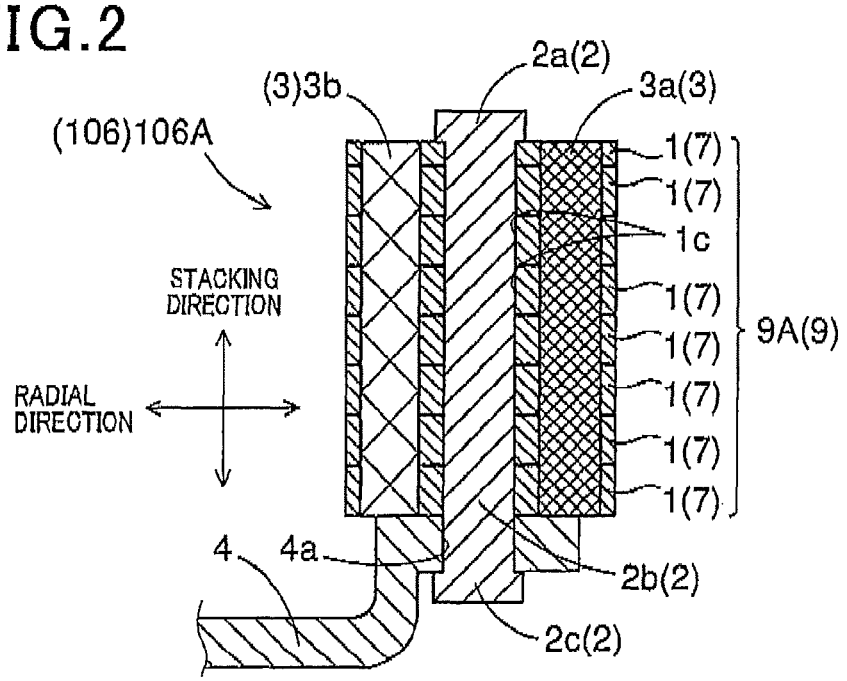
FIG. 2 is a cross-sectional view taken along the line II-II in FIG. 1.

FIGS. 1-2 show the overall configuration of a rotor 106A which is an example of a rotor 106 according to the present invention. The rotor 106A includes a rotor core 9A, a plurality of rivets 2, a plurality of radially outer permanent magnets 3a, a plurality of radially inner permanent magnets 3b and a disc 4. The rotor core 9A is an example of a rotor core 9 according to the present invention. In addition, the rivets 2 correspond to "fixing members" of the present invention; the disc 4 corresponds to "a fixed member" of the present invention.

The rotor core 9A includes a plurality of annular bodies 7 that are stacked in layers in an axial direction of the rotor core 9A. Each of the annular bodies 7 is comprised of a plurality of core segments 1 that are arranged along a circumferential direction of the rotor core 9A (see also FIGS. 6-9). Accordingly, in each of the annular bodies 7, there are a plurality of division sites 1a; at each of the division sites 1a, one circumferentially-adjacent pair of the core segments 1 are divided from each other. In addition, the division sites 1a will be described in detail later.

It should be noted that the rotor core 9A may be obtained either by stacking the annular bodies 7 or by directly stacking all the core segments 1 that constitute the rotor core 9A. In addition, the stacking direction coincides with the axial direction of the rotor core 9A (or the axial direction of the rotor 106A).

The rotor core 9A has a plurality of through-holes 1c formed therein. Moreover, the disc 4 also has a plurality of through-holes 4a formed therein. The number of the through-holes 4a of the disc 4 is equal to the number of the rivets 2. The rotor core 9A is fixed to the disc 4 by the rivets 2 that extend through the through-holes 1c of the rotor core 9A and the through-holes 4a of the disc 4.

In the present embodiment, the number k of magnetic poles formed by the permanent magnets 3 provided in the rotor core 9A is set to, for example, 20. The division number, which denotes the number of the core segments 1 in each of the annular bodies 7, is set to an integer that is a divisor of k and less than or equal to k/2. More particularly, in the present embodiment, the division number is set to 5. Moreover, the number n of the through-holes 1c formed in the rotor core 9A is set to, for example, 20. Accordingly, each of the core segments 1 includes four magnetic poles and four through-holes 1c. In addition, the number of the annular bodies 7 stacked in the axial direction of the rotor core 9A (i.e., the stacking direction) is set to, for example, 8. Accordingly, each of the through-holes 1c of the rotor core 9A is constituted of eight through-holes 1c of the core segments 1 which are aligned with each other in the stacking direction (see FIG. 2).

Each of the core segments 1 is formed by processing a magnetic steel sheet, for example by a press machine, into a predetermined shape such as a fan-like shape. The method of forming the core segments 1 and the thicknesses of the core segments 1 are not limited to a particular method and a particular thickness. For example, in the present embodiment, the core segments 1 located at an end layer (i.e., the uppermost layer in FIG. 2) of the rotor core 9A have a smaller thickness than the core segments 1 located at the layers other than the end layer.

Figure 3:
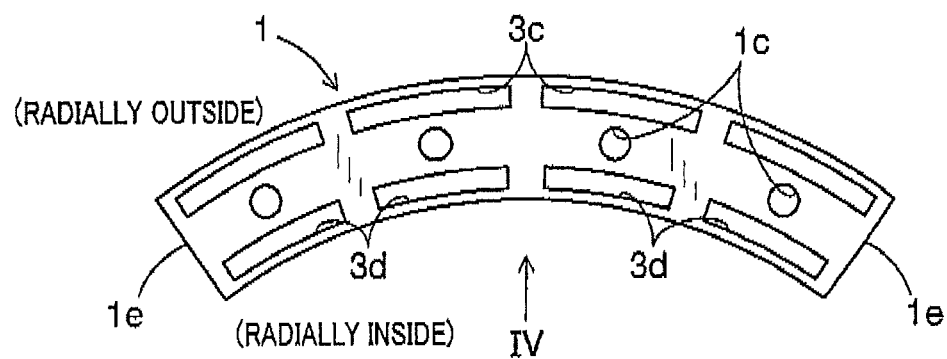
FIG. 3 is a schematic view illustrating a configuration example of core segments.
Figure 4:
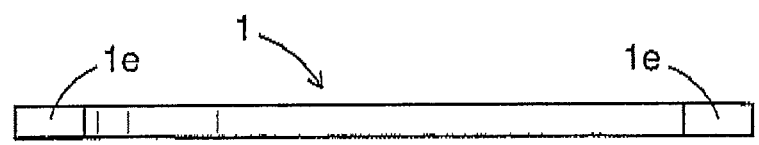
FIG. 4 is a side view along the line IV in FIG. 3.

As shown in FIGS. 3-4, each of the core segments 1 has four through-holes 1c, four radially outer magnet-receiving portions 3c and four radially inner magnet-receiving portions 3d. The radially outer magnet-receiving portions 3c are formed in a radially outer peripheral portion of the core segment 1 so as to penetrate the core segment 1 in the thickness direction (or the stacking direction as shown in FIG. 2). On the other hand, the radially inner magnet-receiving portions 3d are formed in a radially inner peripheral portion of the core segment 1 so as to penetrate the core segment 1 in the thickness direction. Moreover, each of the core segments 1 also has an opposite pair of circumferential end surfaces 1e, which are formed as flat surfaces in the present embodiment.

As shown in FIG. 2, corresponding through-holes 1c of the core segments 1 are coaxially formed with each other so as to allow a corresponding one of the rivets 2 to extend therethrough. Corresponding radially outer magnet-receiving portions 3c of the core segments 1 are aligned with each other in the stacking direction so as to receive a corresponding one of the radially outer permanent magnets 3a therein. Corresponding radially inner magnet-receiving portions 3d of the core segments 1 are aligned with each other in the stacking direction so as to receive a corresponding one of the radially inner permanent magnets 3b therein.

Figure 5:
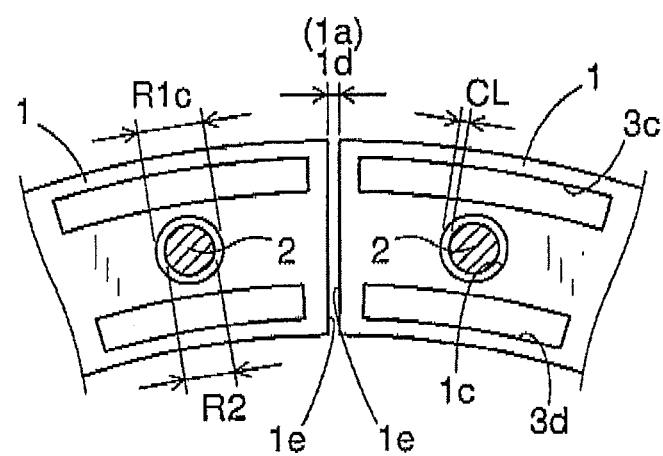
FIG. 5 is a schematic view illustrating a gap and a clearance.

As shown in FIG. 5, between each adjacent pair of the circumferential end surfaces 1e of the core segments 1 on the same layer of the rotor core 9A, there is formed a gap 1d which corresponds to one of the division sites 1a. Moreover, the following relationship is satisfied: CL=(R1c−R2)/2, where R1c is the inner diameter of the through-holes 1c of the core segments 1, R2 is the outer diameter of the rivets 2, and CL is the clearance between the through-holes 1c of the core segments 1 and the corresponding rivets 2. Furthermore, in the present embodiment, the clearance CL is set to be less than the gaps 1d (i.e., 1d>CL).

Setting the clearance CL as above, when any circumferentially adjacent pair of the core segments 1 are both deviated toward the gap 1d therebetween, the circumferential end surfaces 1e of the pair of the core segments 1 are prevented from making contact with each other. Consequently, it is possible to prevent the core segments 1 from being deformed due to contact therebetween, thereby making it possible to accurately assemble the core segments 1.

As shown in FIGS. 6-9, in the present embodiment, each of the annular bodies 7 is comprised of five (i.e., the division number) core segments 1 that are arranged along the circumferential direction. Each of the annular bodies 7 constitutes one of the eight layers of the rotor core 9A. In other words, each of the eight layers of the rotor core 9A is constituted of one of the annular bodies 7 as shown in FIGS. 6-9.

Furthermore, the annular bodies 7 are stacked in a plurality (e.g., four in the present embodiment) of different postures as shown in FIGS. 6-9. It should be noted that for the sake of convenience of explanation, the five core segments 1 in each of the annular bodies 7 are respectively designated by 11, 12, 13, 14 and 15.

Figure 6:
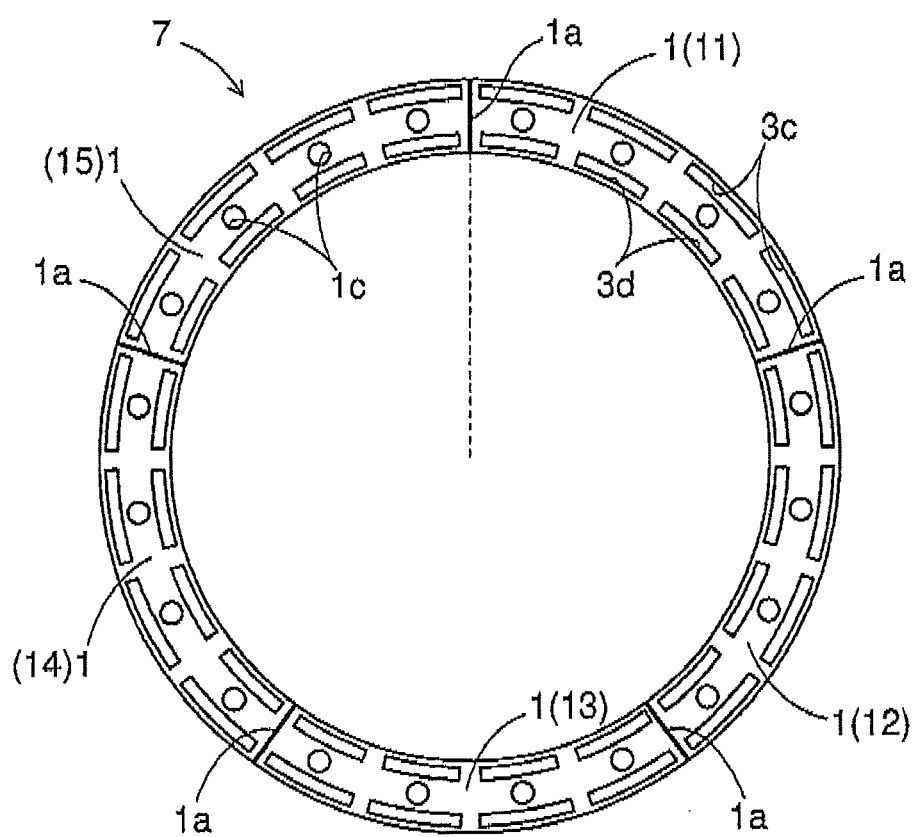
FIG. 6 is a schematic view illustrating an Nth-layer annular body.

First, the annular body 7 shown in FIG. 6 is arranged in the rotor core 9A so that the division site 1a between the core segments 11 and 15 is located at the position of twelve o'clock. This position will be referred to as reference position hereinafter.

Figure 7:
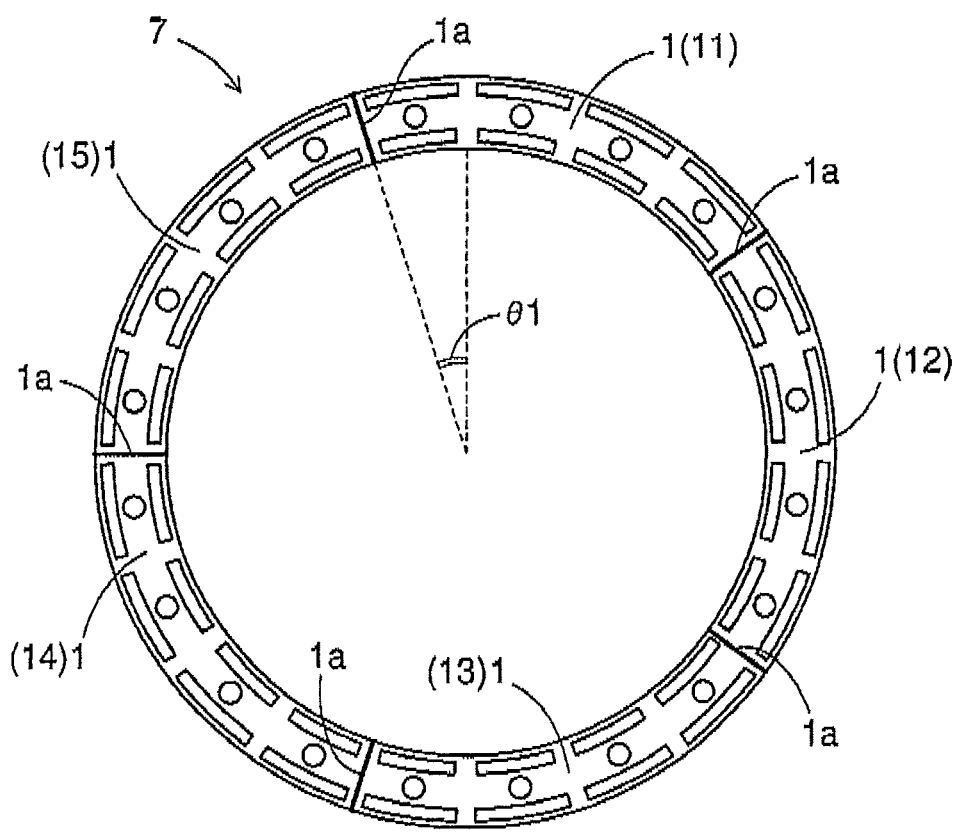
FIG. 7 is a schematic view illustrating an (N±1)th-layer annular body.

Secondly, the annular body 7 shown in FIG. 7 is arranged in the rotor core 9A so that the division site 1a between the core segments 11 and 15 is located at a position deviated counterclockwise from the reference position by a first predetermined angle θ1 (e.g., 18° in the present embodiment). In other words, the annular body 7 shown in FIG. 7 is circumferentially offset from the annular body 7 shown in FIG. 6 by the first predetermined angle θ1 that corresponds to one magnetic pole.

Figure 8:
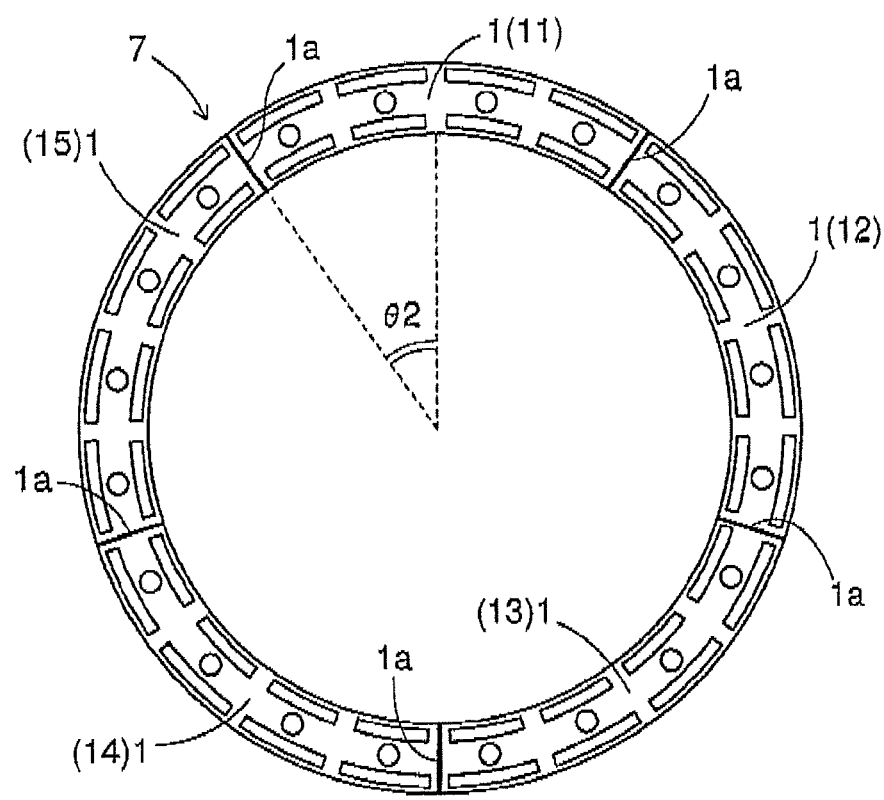
FIG. 8 is a schematic view illustrating an (N±2)th-layer annular body.

Thirdly, the annular body 7 shown in FIG. 8 is arranged in the rotor core 9A so that the division site 1a between the core segments 11 and 15 is located at a position deviated counterclockwise from the reference position by a second predetermined angle θ2 (e.g., 2×θ1 in the present embodiment). In other words, the annular body 7 shown in FIG. 8 is circumferentially offset from the annular body 7 shown in FIG. 6 by the second predetermined angle θ2 that corresponds to two magnetic poles.

Figure 9:
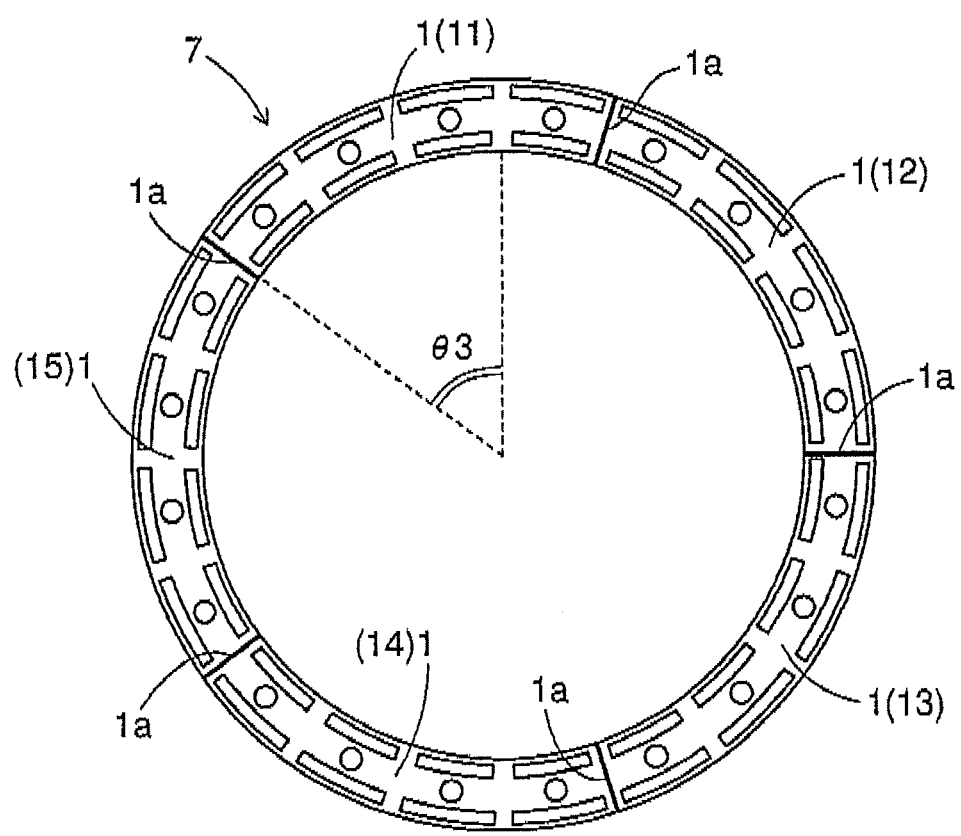
FIG. 9 is a schematic view illustrating an (N±3)th-layer annular body.

Finally, the annular body 7 shown in FIG. 9 is arranged in the rotor core 9A so that the division site 1a between the core segments 11 and 15 is located at a position deviated counterclockwise from the reference position by a third predetermined angle θ3 (e.g., 3×θ1 in the present embodiment). In other words, the annular body 7 shown in FIG. 9 is circumferentially offset from the annular body 7 shown in FIG. 6 by the third predetermined angle θ3 that corresponds to three magnetic poles.

Figure 11:
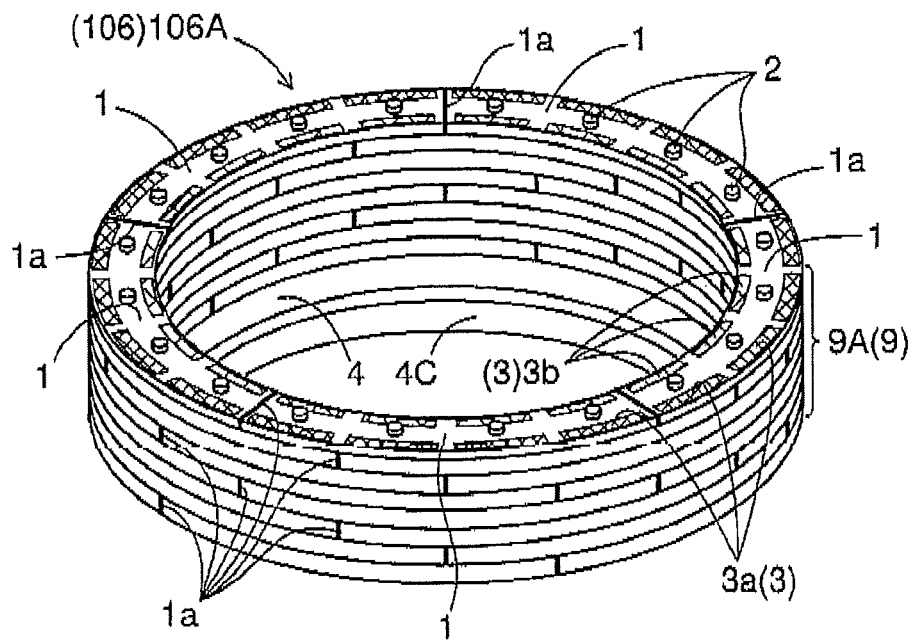
FIG. 11 is a schematic perspective view illustrating a first configuration example of a rotor.

Circumferentially offsetting every four annular bodies 7 (or every four layers) of the rotor core 9A from each other as shown in FIGS. 6-9, the circumferential positions of the division sites 1a of the annular bodies 7 vary in the stacking direction of the annular bodies 7 (or the axial direction of the rotor core 9A) as shown in FIG. 11.

Figure 10:
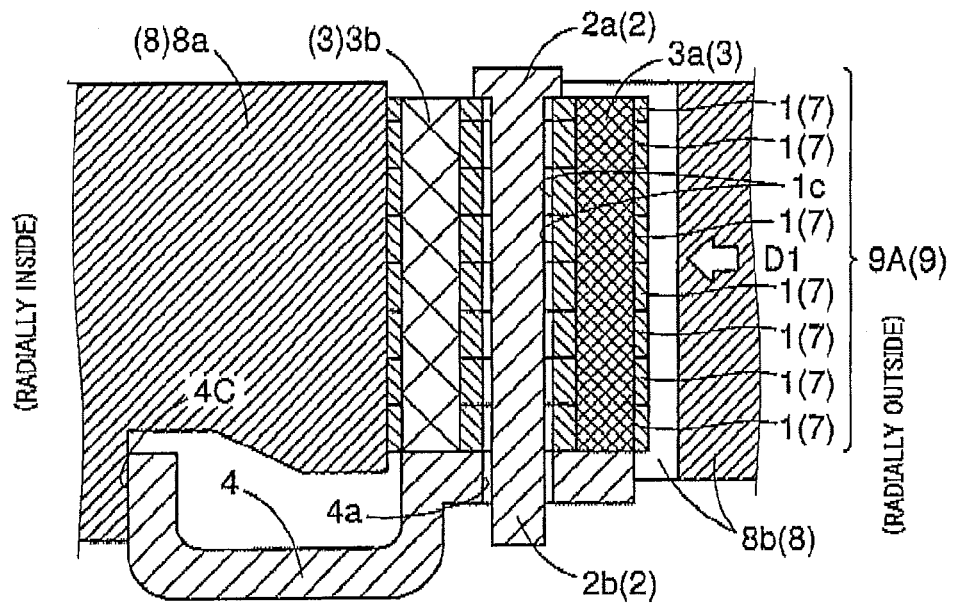
FIG. 10 is a schematic cross-sectional view illustrating a process of fixing the rotor core to a fixed member.

In the present embodiment, all the core segments 1 are assembled (i.e., arranged along the circumferential direction and stacked in the stacking direction), using a jig 8 as shown in FIG. 10, to form the rotor core 9A.

Specifically, the jig 8 includes an inner jig part 8a and an outer jig part 8b. The inner jig part 8a has a radially outer surface that is cylindrical-shaped so as to guide the core segments 1 from the radially inner side. On the other hand, the outer jig part 8b has a radially inner surface that is cylindrical-shaped so as to guide the core segments 1 from the radially outer side.

In the assembly process, the inner jig part 8a is first fitted to a fitting portion 4C of the disc 4; the fitting portion 4C is configured to be fitted on a reference shaft (e.g., a rotating shaft 110 shown in FIG. 12 which will be described later). Then, as shown in FIG. 10, the core segments 1 are arranged in the circumferential direction and stacked in the stacking direction, making contact with the radially outer surface (or wall surface) of the inner jig part 8a. In addition, during this step, the through-holes 1c of the core segments 1 are circumferentially positioned by inserting guide pins or the rivets 2 in the through-holes 1c. Thereafter, the outer jig part 8b is moved radially inward as indicted by the arrow D1 in FIG. 10, pressing the core segments 1 between the radially outer surface of the inner jig part 8a and the radially inner surface of the outer jig part 8b. As a result, the rotor core 9A, whose coaxiality with the fitting portion 4C of the disc 4 is secured, is obtained.

After the assembly process, all the rivets 2 are upset (or deformed), thereby fixing the rotor core 9A to the disc 4. In the present embodiment, since the rivets 2 fix the rotor core 9A to the disc 4 at places other than the division sites 1a, the rotor core 9A, which is the assembly of the core segments 1, is imparted with a rigid body structure as if one-piece core.

As shown in FIG. 10, each of the rivets 2 includes a head portion 2a and a shaft portion 2b. Each of the rivets 2 is placed in the corresponding through-holes 1c of the core segments 1 and the corresponding through-hole 4a of the disc 4, with an end portion thereof opposite to the head portion 2a protruding outside the corresponding through-hole 4a. The end portion opposite to the head portion 2a is then upset using a tool (not shown), forming an upset portion 2c as shown in FIG. 2. That is, the rotor core 9A and the disc 4 are fixed to each other with formation of the upset portions 2c of the rivets 2. Moreover, during the upsetting process, the rivets 2 are plastically deformed, filling gaps between the through-holes 1c of the core segments 1 and the rivets 2. Consequently, the core segments 1 are firmly fixed by the rivets 2. In addition, FIG. 11 shows the rotor 106A in which the rotor core 9A and the disc 4 are fixed together.

Figure 12:
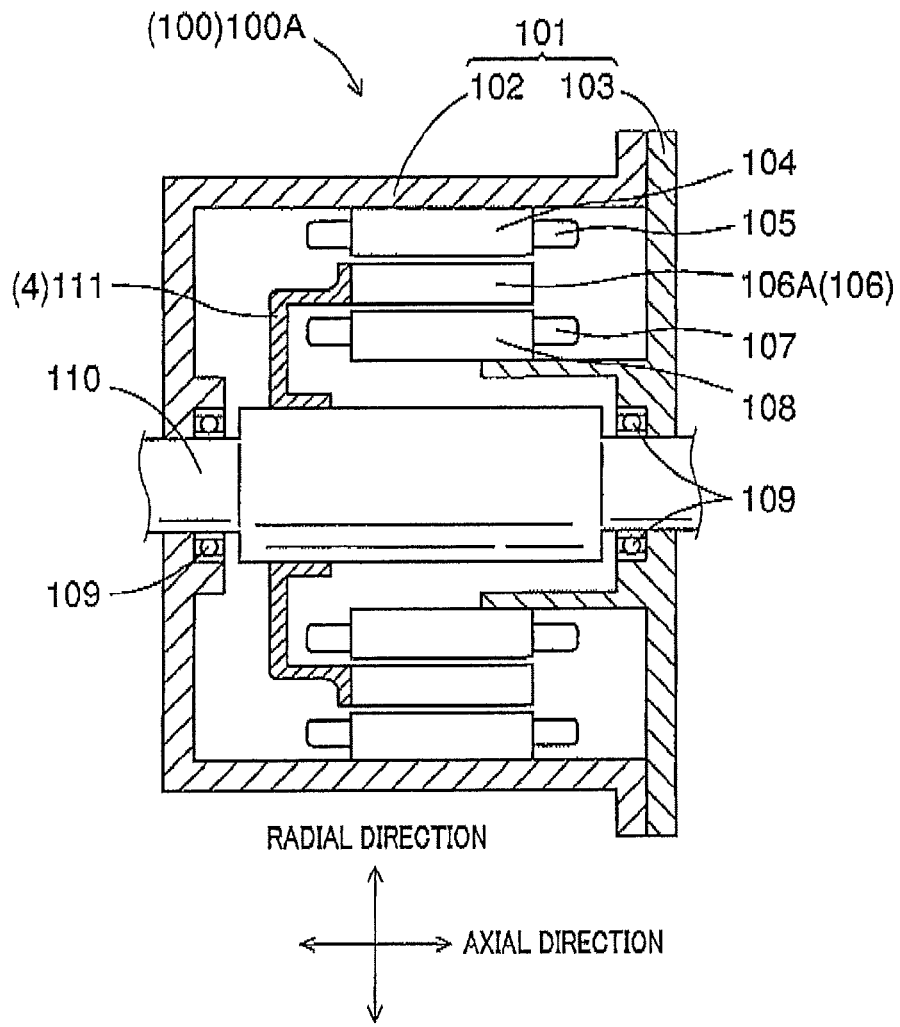
FIG. 12 is a schematic cross-sectional view illustrating a first configuration example of a rotating electric machine.

FIG. 12 shows the overall configuration of a rotating electric machine 100A which includes the rotor 106A described above. The rotating electric machine 100A is an example of a rotating electric machine 100 according to the present invention.

As shown in FIG. 12, the rotating electric machine 100A includes a housing 101, a radially outer stator 104, the rotor 106A, a radially inner stator 108, the rotating shaft 110 and a disc 111. That is, the rotating electric machine 100A is a double-stator rotating electric machine.

The housing 101 includes first and second housing members 102 and 103. The first housing member 102 is formed to have such a shape as to be capable of receiving therein the radially outer stator 104, the rotor 106A, the radially inner stator 108 and the rotating shaft 110 from an opening thereof (e.g., a cup shape). On the other hand, the second housing member 103 is formed to have such a shape as to be capable of covering the opening of the first housing member 102 (e.g., a disc-like shape). Moreover, a pair of bearings 109 are respectively provided between the first housing member 102 and the rotating shaft 110 and between the second housing member 103 and the rotating shaft 110, thereby rotatably supporting the rotating shaft 110. The disc 111, which corresponds to the above-described disc 4, is fixed on the rotating shaft 110.

The radially outer stator 104, the rotor 106A, the radially inner stator 108 are sequentially arranged from the radially outer side in this order. In other words, the rotor 106A is radially interposed between the radially outer stator 104 and the radially inner stator 108. The radially outer stator 104 is fixed to the first housing member 102, while the radially inner stator 108 is fixed to the second housing member 103. It should be appreciated that the radially outer stator 104 and the radially inner stator 108 may also be fixed to the housing 101 in any other suitable manner.

On the radially outer stator 104, there are mounted phase windings 105. On the other hand, on the radially inner stator 108, there are mounted phase windings 107. More specifically, the phase windings 105 and 107 are respectively wound on stator cores of the radially outer and radially inner stators 104 and 108. In addition, the number of phases of the phase windings 105 and 107 is not limited.

The radially outer stator 104 faces a radially outer surface of the rotor 106A. In operation, with supply of electric power to the phase windings 105, the rotor 106A is rotated. In contrast, with rotation of the rotor 106A, counterelectromotive force is generated in the phase windings 105.

The radially inner stator 108 faces a radially inner surface of the rotor 106A. In operation, with supply of electric power to the phase windings 107, the rotor 106A is rotated. In contrast, with rotation of the rotor 106A, counterelectromotive force is generated in the phase windings 107.

Moreover, during rotation of the rotor 106A, centrifugal force acts on the core segments 1 and the rivets 2. The action of the centrifugal force will be described hereinafter with reference to FIGS. 13-14.

Figure 13:
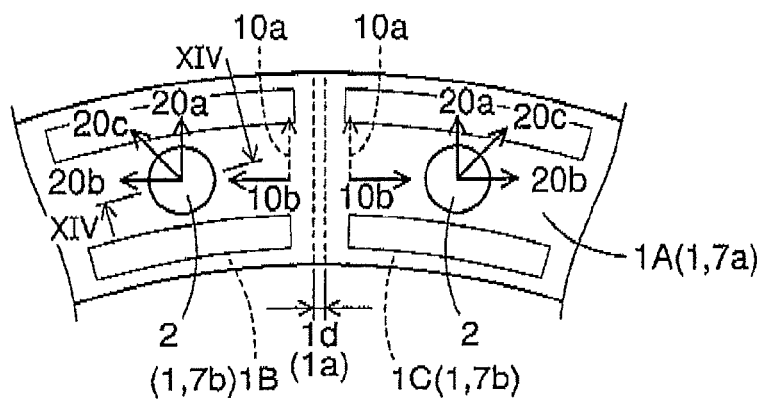
FIG. 13 is a schematic view illustrating the centrifugal force acting on fixing members.
Figure 14:
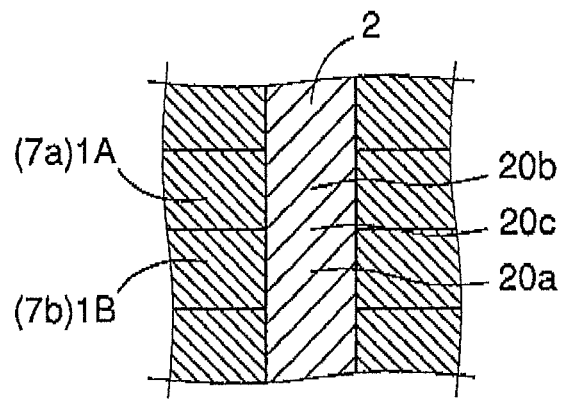
FIG. 14 is a cross-sectional view taken along the line XIV-XIV in FIG. 13.

It should be noted that for the sake of simplicity, only part of the rotor 106A is depicted in FIGS. 13-14 and that for the sake of convenience of explanation, the two annular bodies 7 shown in FIGS. 13-14 are respectively designated by 7a and 7b. Moreover, one of the core segments 1 of the annular body 7a located on the upper side in FIG. 14 is designated by 1A; and only a circumferential central portion of the core segment 1A is shown FIG. 13. On the other hand, circumferentially-adjacent two of the core segments 1 of the annular body 7b located on the lower side in FIG. 14 are respectively designated by 1B and 1C; and only circumferential end portions of the core segments 1B and 1C and the gap 1d formed therebetween are shown in FIG. 13.

As shown in FIG. 13, with rotation of the rotor 106A, the centrifugal force is generated in the rotor core 9A. Thus, at the division site 1a between the core segments 1B and 1C, there are generated forces (see vectors 10a) for the core segments 1B and 1C to expand radially outward. Moreover, there are also generated forces (see vectors 10b) for the core segments 1B and 1C to circumferentially expand via the rivets 2. However, the core segments 1B and 1C, which are divided from each other at the division site 1a, are fixed by the rivets 2. Therefore, those forces will be dispersed, via the rivets 2, to the core segment 1A that is not divided at the division site 1a shown in FIG. 13. Moreover, shearing forces (see vectors 20a) act on those portions of the rivets 2 which correspond to the core segments 1B and 1C; tensile forces (see vectors 20c) act on the core segment 1A in composite directions each of which is a composite of a radial direction (see vectors 20a) and the circumferential direction (see vectors 20b). However, by stacking the core segments 1 so as to be circumferentially offset from one another, the tensile forces will be spirally dispersed in the circumferential direction; the shearing forces acting on the rivets 2 can also be dispersed in the stacking direction. Consequently, it is possible to keep the coaxiality of the rotor 106A (more specifically the rotor core 9A). Accordingly, it is possible to minimize the air gap between the radially outer stator 104 and the rotor 106A and the air gap between the radially inner stator 108 and the rotor 106A.

Second Embodiment

A second exemplary embodiment will be described hereinafter with reference to FIGS. 15-19.

Figure 18:
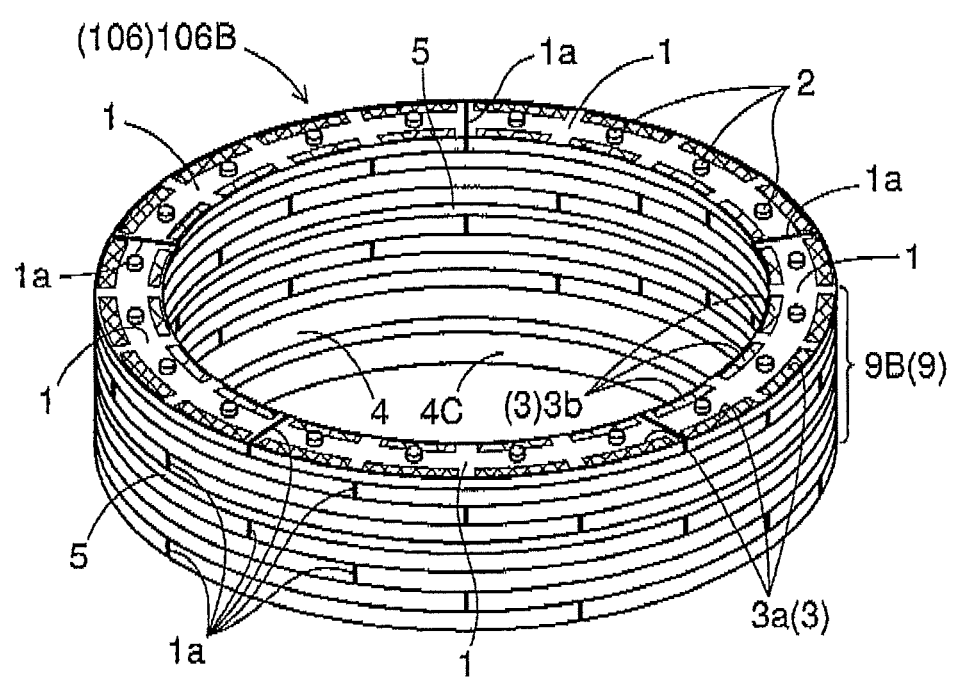
FIG. 18 is a schematic perspective view illustrating a second configuration example of the rotor.

FIG. 18 shows the overall configuration of a rotor 106B which is another example of the rotor 106 according to the present invention. The rotor 106B includes a rotor core 9B, a plurality of rivets 2, a plurality of radially outer permanent magnets 3a, a plurality of radially inner permanent magnets 3b and a disc 4. The rotor core 9B is another example of the rotor core 9 according to the present invention. The rotor 106B differs from the rotor 106A of the first embodiment only in that the rotor core 9B of the rotor 106B further includes a first plate 5 in comparison with the rotor core 9A of the rotor 106A. The first plate 5 is made of a nonmagnetic material and has a smaller thickness than the core segments 1.

Figure 15:
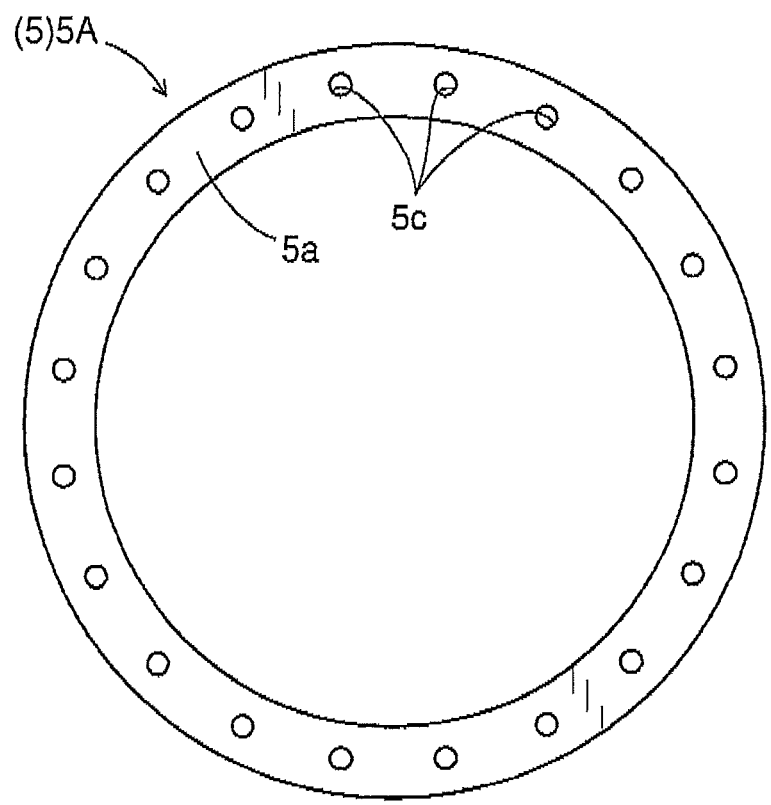
FIG. 15 is a schematic plan view illustrating a first configuration example of a first plate.

FIG. 15 shows an annular plate 5A which is an example of the first plate 5. The annular plate 5A has a plate body 5a and a plurality of through-holes 5c formed in the plate body 5a. Each of the through-holes 5c of the annular plate 5A is coaxially formed with corresponding ones of the through-holes 1c of the core segments 1 so as to allow a corresponding one of the rivets 2 to extend therethrough (see FIG. 17). In addition, the number of the through-holes 5c formed in the annular plate 5A is equal to the number of the through-holes 1c formed in each of the annular bodies 7.

Figure 16:
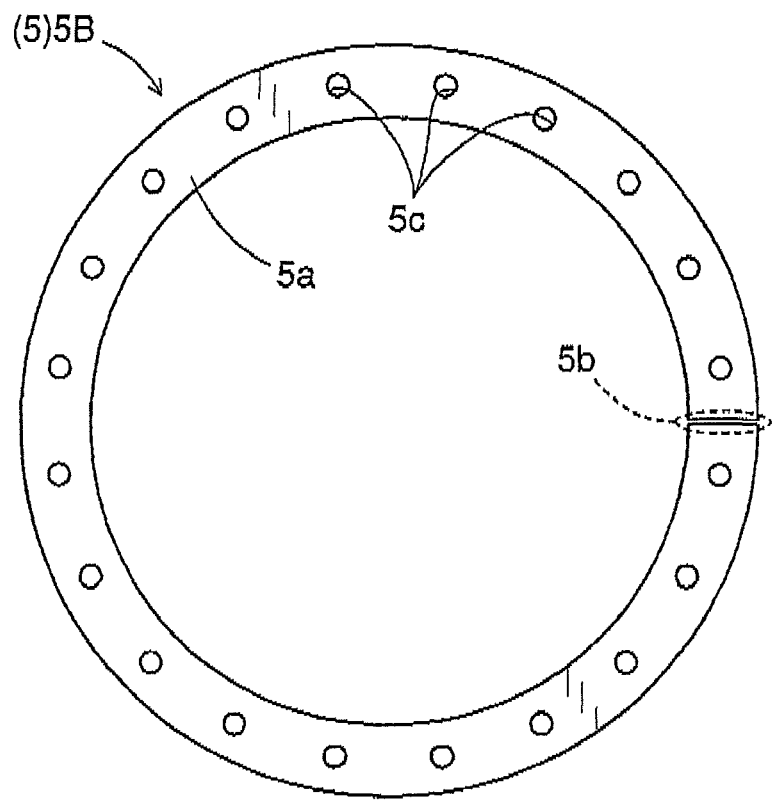
FIG. 16 is a schematic plan view illustrating a second configuration example of the first plate.

FIG. 16 shows an annular plate 5B which is another example of the first plate 5. Compared to the above-described annular plate 5A, the annular plate 5B further has a cut 5b by which the annular plate 5B is made discontinuous in the circumferential direction. The cut 5b is formed in making the annular plate 5B by a rounding process for improving the cutting approach for the plate material. In addition, it is preferable to fix the cut 5b to keep the shape of the annular plate 5B as shown in FIG. 16 at the latest before the assembling of the rotor 106B into a rotating electric machine 100B shown in FIG. 19.

Figure 17:
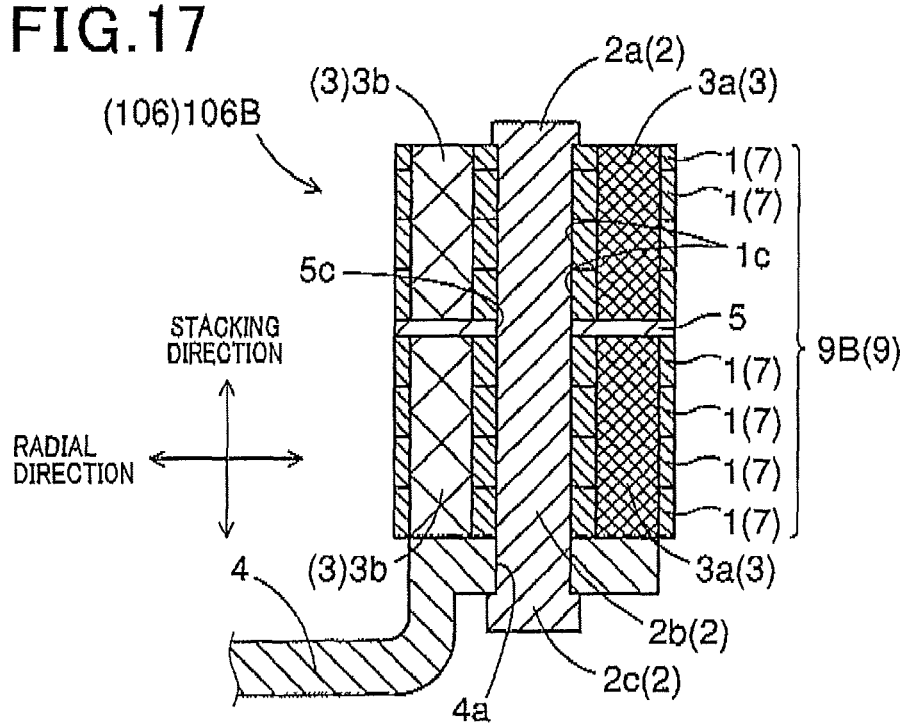
FIG. 17 is a schematic cross-sectional view illustrating a second configuration example of the rotor core.

As shown in FIG. 17, the above-described annular plate 5A or 5B is interposed, as the first plate 5, between an adjacent pair of the annular bodies 7 of the rotor core 9B. More particularly, in the configuration example shown in FIG. 17, the first plate 5 is arranged in the rotor core 9B so that there are four annular bodies 7 on each of the upper and lower sides of the first plate 5.

As in the first embodiment, all the core segments 1 are assembled (i.e., arranged along the circumferential direction and stacked in the stacking direction), using the jig 8 (FIG. 10), to form the rotor core 9B. Moreover, the rotor core 9B is fixed to the disc 4 by the rivets 2 in the same manner as described in the first embodiment. Consequently, as shown in FIG. 17, each of the rivets 2 extends through the corresponding through-holes 1c of the core segments 1, the corresponding through-hole 5c of the first plate 5 and the corresponding through-hole 4a of the disc 4.

Figure 19:
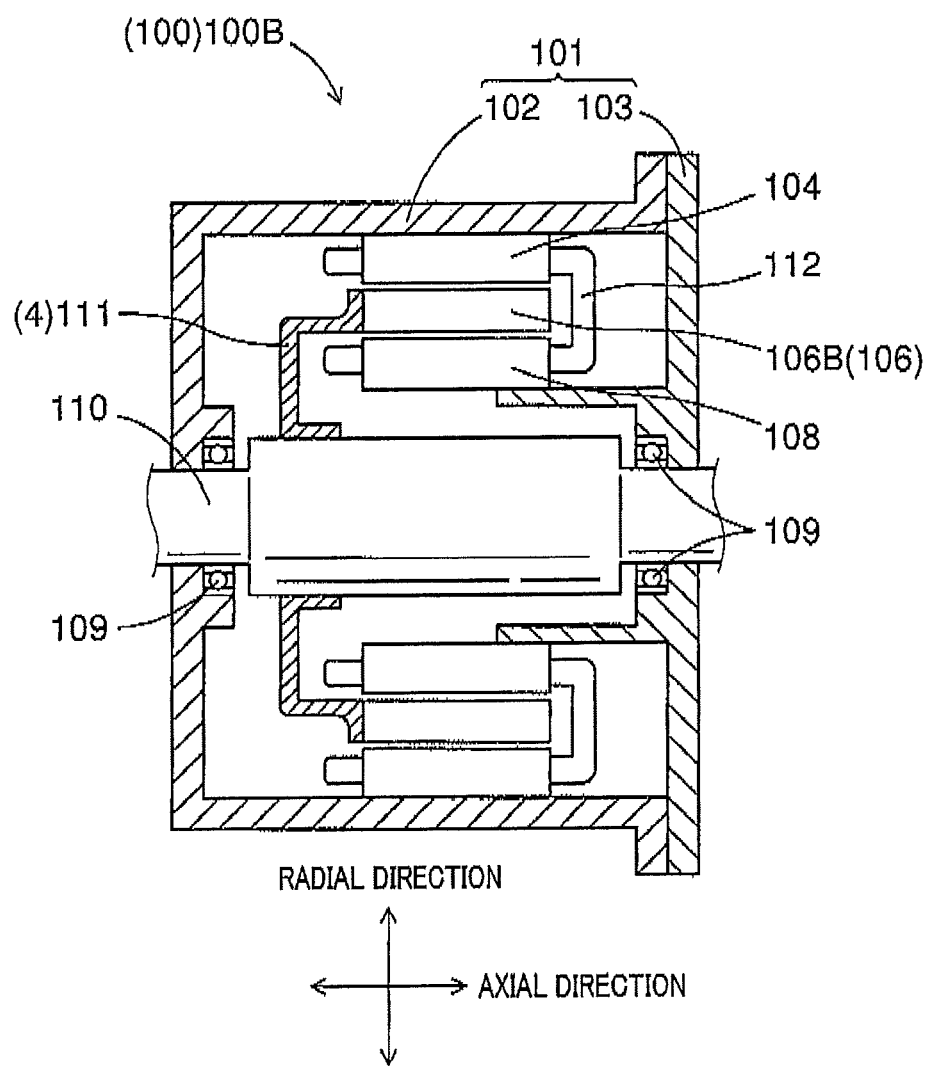
FIG. 19 is a schematic cross-sectional view illustrating a second configuration example of the rotating electric machine.

FIG. 19 shows the overall configuration of the rotating electric machine 100B which includes the rotor 106B described above. The rotating electric machine 100B is another example of the rotating electric machine 100 according to the present invention.

As shown in FIG. 19, the rotating electric machine 100B includes a housing 101, a radially outer stator 104, the rotor 106B, a radially inner stator 108, a rotating shaft 110 and a disc 111. That is, the rotating electric machine 100B is also a double-stator rotating electric machine as the rotating electric machine 100A of the first embodiment. In addition, the disc 111 corresponds to the above-described disc 4 of the rotor 106B.

The rotating electric machine 100B of the present embodiment differs from the rotating electric machine 100A of the first embodiment only in that: (1) the rotating electric machine 100B employs the rotor 106B of the present embodiment instead of the rotor 106A of the first embodiment; and (2) the radially outer and radially inner stators 104 and 108 have mounted thereon U-shaped phase windings 112 instead of the phase windings 105 and 107 described in the first embodiment.

During rotation of the rotor 106B, centrifugal force acts on the core segments 1 and the rivets 2 as described in the first embodiment (see FIG. 13). However, in the rotor 106B, the annular bodies 7 (or core segments 1) are stacked so as to be circumferentially offset from one another. Therefore, forces in various directions dispersedly act on the rivets 2; but no large force concentrated in a particular direction acts on the rivets 2. Moreover, with the first plate 5 interposed between the annular bodies 7, the rigidity of the rotor 106B is enhanced. Consequently, even when the rotor 106B rotates at high speed, it is still possible to keep the coaxiality of the rotor 106B (more specifically the rotor core 9B). Accordingly, it is possible to minimize the air gap between the radially outer stator 104 and the rotor 106B and the air gap between the radially inner stator 108 and the rotor 106B.

In addition, though not shown in the figures, the rotor 106B of the present embodiment may be employed, instead of the rotor 106A of the first embodiment, in the rotating electric machine 100A of the first embodiment. Similarly, the rotor 106A of the first embodiment may be employed, instead of the rotor 106B of the present embodiment, in the rotating electric machine 100B of the present embodiment.

Third Embodiment

A third exemplary embodiment will be described hereinafter with reference to FIGS. 20-24.

Figure 20:
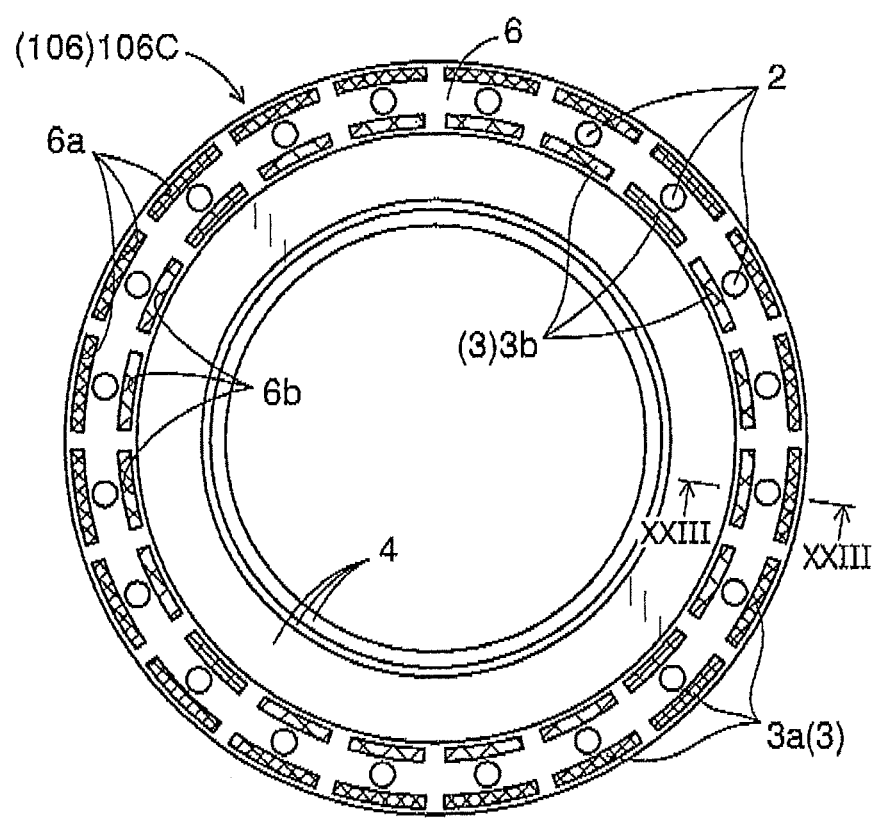
FIG. 20 is a schematic cross-sectional view illustrating a third configuration example of the rotor core.
Figure 24:
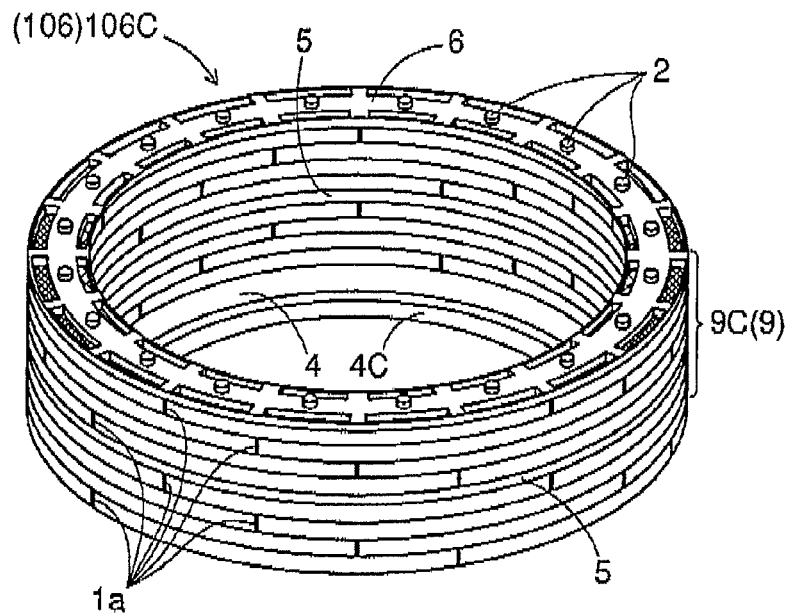
FIG. 24 is a schematic perspective view illustrating a third configuration example of the rotor.

FIGS. 20 and 24 show the overall configuration of a rotor 106C which is yet another example of the rotor 106 according to the present invention. The rotor 106C includes a rotor core 9C, a plurality of rivets 2, a plurality of radially outer permanent magnets 3a, a plurality of radially inner permanent magnets 3b and a disc 4. The rotor core 9C is yet another example of the rotor core 9 according to the present invention. The rotor 106C differs from the rotor 106B of the second embodiment only in that the rotor core 9C of the rotor 106C further includes a second plate 6 in comparison with the rotor core 9B of the rotor 106B.

The second plate 6 is formed of a magnetic material into a predetermined shape. The second plate 6 has a smaller thickness than the core segments 1.

Figure 21:
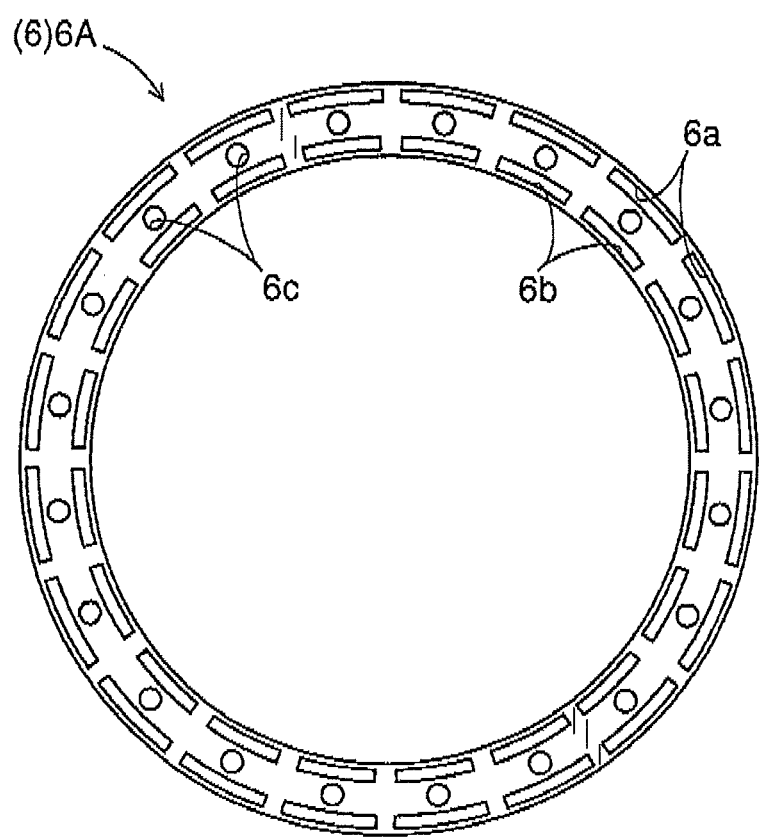
FIG. 21 is a schematic plan view illustrating a first configuration example of a second plate.
Figure 23:
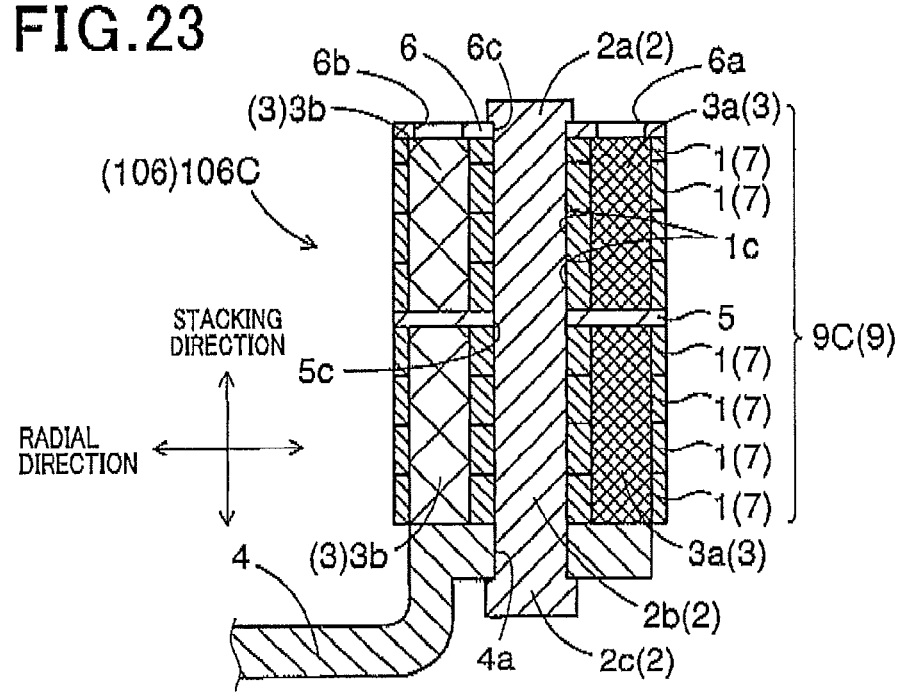
FIG. 23 is a cross-sectional view taken along the line XXIII-XXIII in FIG. 20.

FIG. 21 shows an annular plate 6A which is an example of the second plate 6. The annular plate 6A has a plurality of radially outer window holes 6a, a plurality of radially inner window holes 6b and a plurality of through-hales 6c. As shown in FIG. 23, each of the radially outer window holes 6a is aligned in the stacking direction with a corresponding one of the radially outer permanent magnets 3a, thereby allowing the heat of the corresponding radially outer permanent magnet 3a to be dissipated via the radially outer window hole 6a. Similarly, each of the radially inner window holes 6b is aligned in the stacking direction with a corresponding one of the radially inner permanent magnets 3b, thereby allowing the heat of the corresponding radially inner permanent magnet 3b to be dissipated via the radially inner window hole 6b. Moreover, each of the through-holes 6c of the annular plate 6A is coaxially formed with corresponding ones of the through-holes 1c of the core segments 1 so as to allow a corresponding one of the rivets 2 to extend therethrough. In addition, the number of the radially outer window holes 6a is equal to the number of the radially outer permanent magnets 3a; the number of the radially inner window holes 6b is equal to the number of the radially inner permanent magnets 3b; the number of the through-holes 6c is equal to the number of the through holes 1c formed in each of the annular bodies 7.

Moreover, as shown in FIG. 23, each of the radially outer window holes 6a of the annular plate 6A is sized so that only part of the corresponding radially outer permanent magnet 3a is exposed from the radially otter window hole 6a. Similarly, each of the radially inner window holes 6b is sized so that only part of the corresponding radially inner permanent magnet 3b is exposed from the radially inner window hole 6b. Consequently, after the annular plate 6A is fixed to the core segments 1 by the rivets 2, all of the radially outer permanent magnets 3a and the radially inner permanent magnets 3b are partially pressed by the annular plate 6A, thereby being fixed between the annular plate 6A and the disc 4.

Figure 22:
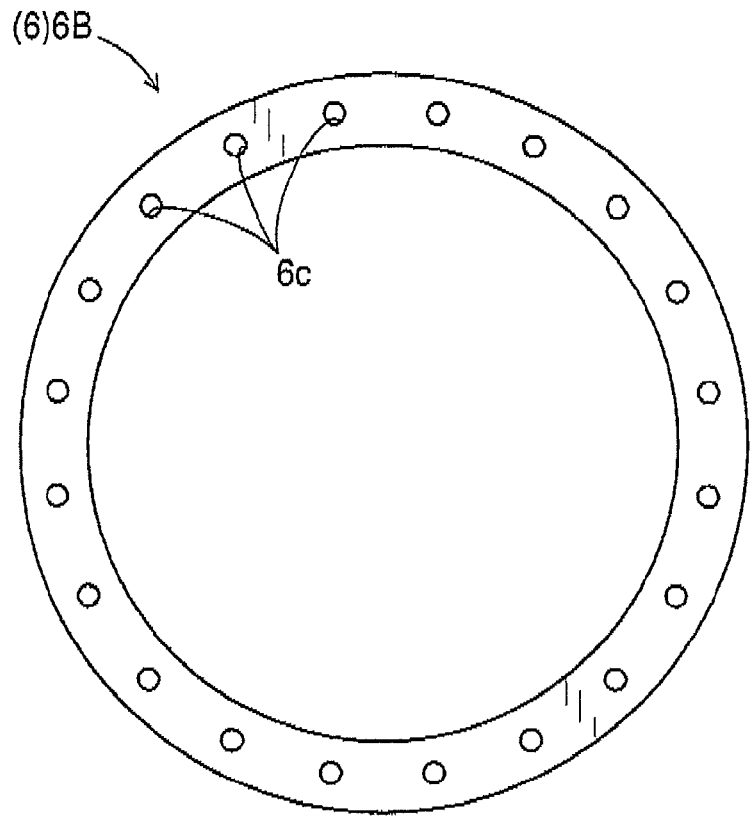
FIG. 22 is a schematic plan view illustrating a second configuration example of the second plate.

FIG. 22 shows an annular plate 6B which is another example of the second plate 6. Compared to the above-described annular plate 6A, the annular plate 6B has neither radially outer window holes 6a nor radially inner window holes 6b. In other words, the annular plate 6B has only a plurality of through-holes 6c formed therein.

In addition, though not shown in the figures, the annular plates 6A and 6B may be modified to have a cut similar to the cut 5b shown in FIG. 6.

As shown in FIG. 23, the above-described annular plate 6A or 6B is arranged, as the second plate 6, at the end of the rotor core 9C opposite to the disc 4. Consequently, all the core segments 1 (or all the annular bodies 7) are interposed between the second plate 6 and the disc 4.

As in the first embodiment, all the core segments 1 are assembled (i.e., arranged along the circumferential direction and stacked in the stacking direction), using the jig 8 (FIG. 10), to form the rotor core 9C. Moreover, the rotor core 9C is fixed to the disc 4 by the rivets 2 in the same manner as described in the first embodiment. Consequently, as shown in FIG. 23, each of the rivets 2 extends through the corresponding through-hole 6c of the second plate 6, the corresponding through-holes 1c of the core segments 1, the corresponding through-hole 5c of the first plate 5 and the corresponding through-hole 4a of the disc 4.

The above-described rotor 106C can be employed in the rotating electric machine 100 according to the present invention. For example, though not shown in the figures, the rotor 106C may be employed, instead of the rotor 106A, in the rotating electric machine 100A of the first embodiment. Otherwise, the rotor 106C may be employed, instead of the rotor 106B, in the rotating electric machine 100B of the second embodiment.

During rotation of the rotor 106C, centrifugal force acts on the core segments 1 and the rivets 2 as described in the first embodiment (see FIG. 13). However, in the rotor 106C, the annular bodies 7 (or core segments 1) are stacked so as to be circumferentially offset from one another. Therefore, forces in various directions dispersedly act on the rivets 2; but no large force concentrated in a particular direction acts on the rivets 2. Moreover, with the first and second plates 5 and 6, the rigidity of the rotor 106C is enhanced. Consequently, even when the rotor 106C rotates at high speed, it is still possible to keep the coaxiality of the rotor 106C (more specifically the rotor core 9C). Accordingly, it is possible to minimize the air gap between a radially outer stator 104 and the rotor 106C and the air gap between a radially inner stator 108 and the rotor 106C.

Other Embodiments

The present invention is not limited to the above-described exemplary embodiments. Instead, the present invention can also be carried out in various other modes without departing from the spirit of the present invention.

(1) In the above-described embodiments, the circumferential end surfaces 1e of the core segments 1 are formed as flat surfaces. Moreover, between each adjacent pair of the circumferential end surfaces 1e of the core segments 1, there is formed the gap 1d (see FIGS. 3-5).

Figure 25:
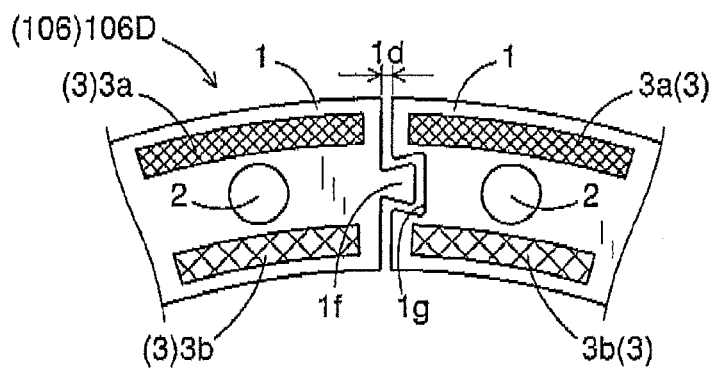
FIG. 25 is a schematic view illustrating a fourth configuration example of the rotor core.
Figure 26:
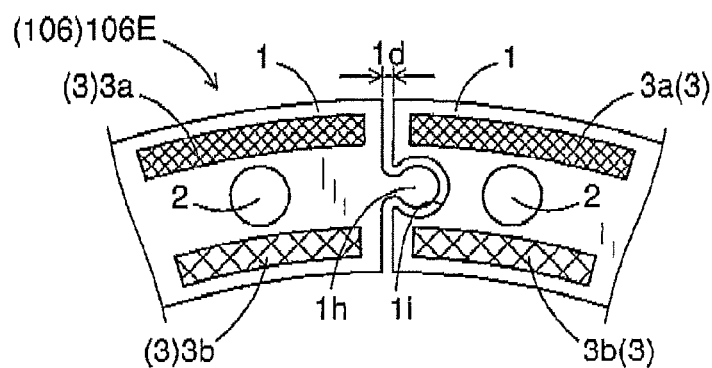
FIG. 26 is a schematic view illustrating a fifth configuration example of the rotor core.

However, as shown in FIGS. 25-26, the circumferential end surfaces 1e of the core segments 1 may also be formed so that each adjacent pair of the circumferential end surfaces 1e of the core segments 1 can be fitted to each other.

FIG. 25 shows part of a rotor 106D which is an example of the rotor 106 according to the present invention. In the rotor 106D, for each adjacent pair of the circumferential end surfaces 1e of the core segments 1, one of the circumferential end surfaces 1e of the pair has a trapezoidal protrusion 1f formed thereon, while the other circumferential end surface 1e has a trapezoidal recess 1g formed therein. The protrusion 1f is fitted into the recess 1g in the stacking direction (i.e., the direction perpendicular to the paper surface of FIG. 25), keeping the gap 1d between the two circumferential end surfaces 1e.

FIG. 26 shows part of a rotor 106E which is another example of the rotor 106 according to the present invention. In the rotor 106E, for each adjacent pair of the circumferential end surfaces 1e of the core segments 1, one of the circumferential end surfaces 1e of the pair has a circular protrusion 1h formed thereon, while the other circumferential end surface 1e has a circular recess 1i formed therein. The protrusion 1h is fitted into the recess 1i in the stacking direction (i.e., the direction perpendicular to the paper surface of FIG. 26), keeping the gap 1d between the two circumferential end surfaces 1e.

In addition, the protrusion 1f and the recess 1g shown in FIG. 25 and the protrusion 1h and the recess 1i shown in FIG. 26 may be modified to have other shapes. In any cases, with the fit between the protrusion and the recess, each adjacent pair of the core segments 1 are circumferentially linked with each other, thereby improving the coaxially of the rotor 106 (more specifically, the rotor core 9).

(2) In the above-described embodiments, the rotor 106 has the radially outer permanent magnets 3a provided in a radially outer peripheral portion of the rotor core 9 and the radially inner permanent magnets 3b provided in a radially inner peripheral portion of the rotor core 9 (see FIGS. 1-2, 17-18 and 20).

However, it is possible to modify the rotor core 9 to have a salient-pole structure, thereby producing reluctance torque. Further, with the salient-pole structure, it is possible to omit the radially outer permanent magnets 3a or the radially inner permanent magnets 3b from the rotor 106.

In the case of omitting the radially outer permanent magnets 3a, magnetic flux would flow between the rotor 106 and the radially inner stator 108. Therefore, it is also possible to omit the radially outer stator 104 and the phase windings 105 from the rotating electric machine 100. In this case, the rotating electric machine 100 would become an outer rotor-type rotating electric machine.

In contrast, in the case of omitting the radially inner permanent magnets 3b, magnetic flux would flow between the rotor 106 and the radially outer stator 104. Therefore, it is also possible to omit the radially inner stator 108 and the phase windings 107 from the rotating electric machine 100. In this case, the rotating electric machine 100 would become an inner rotor-type rotating electric machine.

(3) In the above-described embodiments, the number k of the magnetic poles formed by the permanent magnets 3 provided in the rotor core 9 is set to 20. The division number is set to 5. The number n of the through-holes 1c formed in the rotor core 9 is set to 20.

However, the number k of the magnetic poles may be set to any suitable natural number other than 20. The division number may be set to any integer other than 5, provided that the integer is a divisor of k and less than or equal to k/2. The number n of the through-holes 1c formed in the rotor core 9 may be set to any natural number other than 20, subject to n≥k.

In addition, in terms of suppressing decrease in the strength of the rotor core 9 against the centrifugal force, it is preferable to set the division number small. On the other hand, in terms of improving the coaxiality of the rotor core 9, it is preferable to set the division number large. Therefore, in practice, the division number may be suitably set according to the use and design specification of the rotating electric machine 100. Moreover, other dimensions, such as the radial width of the core segments 1 and the diameter of the rivets 2, may also be suitably set in consideration of the outer diameter and maximum rotational speed of the rotor 106, so as to ensure the strength of the rotor core 9 against the centrifugal force.

(4) In the above-described embodiments, for all the annular bodies 7, every two annular bodies 7 adjacent to each other in the stacking direction are circumferential offset from each other (see FIGS. 11, 18 and 24).

However, the above circumferential offsetting of the annular bodies 7 may be made for only some of the annular bodies 7. In any cases, it is necessary that at least one of the annular bodies 7 be circumferentially offset from another of the annular bodies 7.

(5) In the above-described embodiments, the rivets 2 are employed as the fixing members for fixing the rotor core 9 to the disc 4. Moreover, for each of the rivets 2, the disc-side end portion of the rivet 2 is upset to form the upset portion 2c (see FIGS. 2, 11 and 17).

However, other fixing members may be employed, instead of the rivets 2, to fix the rotor core 9 to the disc 4. For example, bolts may be employed instead of the rivets 2. In this case, end portions of the bolts may be upset to fix the rotor core 9 to the disc 4.

In addition, it is also possible to weld the end portions of the fixing members (e.g., the rivets 2 or bolts) to the disc 4 instead of upsetting them.

(6) In the above-described embodiments, the core segments 1 located at the end layer of the rotor core 9 on the opposite side to the disc 4 have a smaller thickness than the core segments 1 located at the layers other than the end layer (see FIGS. 2, 17-18 and 23).

However, it is also possible to form all of the core segments 1 to have the same thickness (within allowable limits of error). Otherwise, it is also possible to form the core segments 1 so that the thicknesses of the core segments 1 gradually decrease in the stacking direction away from the disc 4.

(7) In the above-described embodiments, in the assembly process, the core segments 1 are arranged in the circumferential direction and stacked in the stacking direction, making contact with the radially outer surface of the inner jig part 8a. Then, the outer jig part 8b is moved radially inward, pressing the core segments 1 between the radially outer surface of the inner jig part 8a and the radially inner surface of the outer jig part 8b (see FIG. 10).

However, the assembly process may be modified so that: the core segments 1 are arranged in the circumferential direction and stacked in the stacking direction, making contact with the radially inner surface of the outer jig part 8b; and then the inner jig part 8a is moved radially outward, pressing the core segments 1 between the radially outer surface of the inner jig part 8a and the radially inner surface of the outer jig part 8b.

[Advantageous Effects]

According to the above-described embodiments, it is possible to achieve the following advantageous effects.

(1) In the above-described embodiments, the rotor 106 (106A-106E) includes the rotor core 9 (9A-9C) and the permanent magnets 3 (i.e., the radially outer permanent magnets 3a and the radially inner permanent magnets 3b) provided in the rotor core 9. The rotor core 9 includes the annular bodies 7 that are stacked in layers in the stacking direction. Each of the annular bodies 7 is comprised of the core segments 1 that are made of a magnetic steel sheet and arranged along the circumferential direction of the rotor core 9. The number of the core segments 1 in each of the annular bodies 7 (i.e., the division number) is set based on k, where k is a natural number representing the number of the magnetic poles formed by the permanent magnets 3. The rotor core 9 has the n through-holes 1c formed therein, where n is a natural number greater than or equal to k. The rotor 106 further includes the n rivets 2 (i.e., the n fixing members) each of which extends in the stacking direction through a corresponding one of the through-holes 1c of the rotor core 9 so as to fix the rotor core 9 to the disc 4 (i.e., the fixed member). Between each circumferentially adjacent pair of the core segments 1, there is formed the gap 1d that is greater than the clearance CL provided between the through-holes 1c of the rotor core 9 and the rivets 2. At least one of the annular bodies 7 is circumferentially offset from another of the annular bodies 7 by an integer multiple of one magnetic pole.

With the above configuration, there are the gap 1d formed between each circumferentially adjacent pair of the core segments 1 and the clearance CL provided between the through-holes 1c of the rotor core 9 and the rivets 2. With the gap 1d and the clearance CL, the tolerances in forming the core segments 1 and the deviations in assembling the core segments 1 and in fixing the rotor core 9 to the disc 4 by the rivets 2 can be absorbed. Therefore, it is possible to easily perform the assembly process of the rotor core 9 by arranging and stacking the core segments 1 along the jig 8 whose coaxiality is ensured. Consequently, it is possible to reduce the time and effort for performing the assembly process.

Moreover, with the gap 1d and the clearance CL, it is possible to secure high roundness and thus high coaxiality of the rotor core 9 only by assembling the core segments 1 along the shape of the jig 8. Consequently, with the high coaxiality of the rotor core 9 (or the rotor 106), it is possible to minimize the air gap between the radially outer stator 104 and the rotor 106 and the air gap between the radially inner stator 108 and the rotor 106.

Furthermore, with the clearance CL less than the gap 1d, when any circumferentially adjacent pair of the core segments 1 are both deviated toward the gap 1d therebetween, the circumferential end surfaces 1e of the pair of the core segments 1 are prevented from making contact with each other. Consequently, it is possible to prevent the core segments 1 from being deformed due to contact therebetween, thereby making it possible to accurately assemble the core segments 1.

In addition, with the above configuration, it is possible to improve the material yield of the rotor core 9 in comparison with the case of forming a rotor core into one piece by, for example, blanking. Moreover, it is also possible to reduce the sizes of dies used for forming the core segments 1. Consequently, it is possible to reduce the manufacturing cost of the rotor 106.

(2) In the above-described embodiments, the annular body 7 (or the core segments 1) located at the end of the rotor core 9 on the opposite side to the disc 4 has a smaller thickness than the other annular bodies 7 (see FIGS. 2, 17-18 and 23). Moreover, though not shown in the figures, it is also possible to form both the annular bodies 7 respectively located at opposite ends of the rotor core 9 to have a smaller thickness than the other annular bodies 7.

Consequently, it is possible to reduce the shearing forces applied to the rivets 2 from the core segments 1 of the annular bodies 7 located at the ends of the rotor core 9. As a result, it is possible to reduce the total shearing forces applied to the rivets 2, thereby enhancing the strength of the rotor core 9 against the centrifugal force.

(3) In the above-described embodiments, the number of the core segments 1 in each of the annular bodies 7 is set to an integer (e.g., 5) that is a divisor of k and less than or equal to k/2 (see FIGS. 1, 6-9, 11, 18 and 24).

Consequently, it is possible to improve the cutting approach for the core material while securing the strength of the rotor core 9 against the centrifugal force.

(4) In the above-described embodiments, for all the annular bodies 7, every two annular bodies 7 adjacent to each other in the stacking direction are circumferential offset from each other (see FIGS. 11, 18 and 24).

Consequently, it is possible to effectively disperse the shearing forces acting on the rivets 2, thereby enhancing the strength of the rotor core 9 against the centrifugal force.

(5) In the above-described embodiments, the gap 1d is formed between adjacent two of the magnetic poles (see FIGS. 5 and 25-26).

Consequently, it is possible to secure sufficiently long distances from the division site 1a (or from the circumferential end surfaces 1e of the core segments 1) to the radially outer permanent magnets 3a received in the radially outer magnet-receiving portions 3c of the core segments 1 and the radially inner permanent magnets 3b received in the radially inner magnet-receiving portions 3d of the core segments 1. As a result, it is possible to enhance the rigidity of the core segments 1, thereby enhancing the strength of the rotor core 9 against the centrifugal force.

(6) In the embodiments shown in FIGS. 25-26, for each adjacent pair of the circumferential end surfaces 1e of the core segments 1, one of the circumferential end surfaces 1e of the pair has the protrusion (1f or 1h) formed thereon, and the other circumferential end surface 1e has the recess (1g or 1i) formed therein. The protrusion is fitted in the recess, keeping the gap 1d between the two circumferential end surfaces 1e.

Consequently, with the fit between the protrusion and the recess, it is possible to improve the efficiency of the assembly process of the rotor core 9. Moreover, each adjacent pair of the core segments 1 are circumferentially linked with each other, thereby improving the coaxially of the rotor 106 (more specifically, the rotor core 9).

(7) In the above-described embodiments, for each of the rivets 2, the disc-side end portion of the rivet 2 is upset to form the upset portion 2c (see FIGS. 2, 17 and 23). Moreover, though not shown in the figures, for each of the rivets 2, the head portion 2a (i.e., the end portion on the opposite side to the disc 4) of the rivet 2 may also be formed by upsetting after the placement of the rivet 2 in the corresponding through-hole 1c of the rotor core 9.

With the above configuration, it is possible to constitute the rivets 2 (i.e., the fixing members) with straight pins, thereby reducing the manufacturing cost.

(8) In the second and third embodiments, the rotor 106 further includes the annular first plate 5 that is made of a nonmagnetic material and interposed between one adjacent pair of the annular bodies 7 in the stacking direction (see FIGS. 15-18 and 23-24). Moreover, though not shown in the figures, the rotor 106 may include a plurality of annular first plates 5 each of which is made of a nonmagnetic material and interposed between a corresponding adjacent pair of the annular bodies 7 in the stacking direction.

Consequently, the first plate(s) 5 can serve as a reinforcement plate without causing magnetic flux leakage. As a result, it is possible to enhance the strength of the rotor core 9 against the centrifugal force. Moreover, with the first plate(s) 5, it is possible to suppress expansion of the outer diameter of the rotor core 9 and stress induced in the disc 4.

(9) In the third embodiment, the rotor 106 further includes the annular second plate 6 that is arranged on the opposite side of the rotor core 9 to the disc 4 (i.e., the fixed member) so as to have the rotor core 9 interposed between the second plate 6 and the disc 4 in the stacking direction. The second plate 6 has the through-holes 6c each of which is coaxially formed with a corresponding one of the through-holes 1c of the rotor core 9 so as to allow a corresponding one of the rivets 2 (i.e., the fixing members) to extend therethrough (see FIGS. 21-24).

Consequently, by arranging the second plate 6 at the furthest position from the disc 4, it is possible to enhance the strength of the rotor core 9 against the centrifugal force. Moreover, it is possible to restrain axial movement of the core segments 1, thereby stabilizing the axial dimension of the rotor core 9, preventing damage of the rotor core 9 and suppressing noise due to rotation of the rotor 106.

(10) Further, in the third embodiment, the second plate 6 has the window holes 6a and 6b each of which is aligned in the stacking direction with a corresponding one of the permanent magnets 3 (3a, 3b) provided in the rotor core 9. Each of the window holes 6a and 6b is sized so that only part of the corresponding permanent magnet 3 is exposed from the window hole (see FIGS. 20-21 and 23-24).

With the above configuration, it is possible to enhance the rigidity of the rotor core 9 and thus the strength of the rotor core 9 against the centrifugal force while allowing the heat of the permanent magnets 3 to be dissipated via the corresponding window holes 6a and 6b of the second plate 6.

(11) In the above-described embodiments, the rotating electric machine 100 (100A-100C) includes the rotor 106 (106A-106C), the radially outer stator 104 disposed radially outside the rotor 106 and the radially inner stator 108 disposed radially inside the rotor 106.

Since the rotor 106 has high roundness and thus high coaxiality, it is possible to minimize the air gap between the radially outer stator 104 and the rotor 106 and the air gap between the radially inner stator 108 and the rotor 106, thereby improving the permeance of the rotating electric machine 100.

What is claimed is:

1. A rotor comprising:
a rotor core including a plurality of annular bodies that are stacked in layers in a stacking direction, each of the annular bodies being comprised of a plurality of core segments that are made of a magnetic steel sheet and arranged along a circumferential direction of the rotor core; and
a plurality of permanent magnets provided in the rotor core,
wherein
the number of the core segments in each of the annular bodies is set based on k, where k is a natural number representing the number of magnetic poles formed by the permanent magnets,
the rotor core has n through-holes formed therein, where n is a natural number greater than or equal to k,
the rotor further comprises n fixing members each of which extends in the stacking direction through a corresponding one of the through-holes of the rotor core so as to fix the rotor core to a fixed member,
between each circumferentially adjacent pair of the core segments, there is formed a gap that is greater than a clearance provided between the through-holes of the rotor core and the fixing members, and
at least one of the annular bodies is circumferentially offset from another of the annular bodies by an integer multiple of one magnetic pole.

2. The rotor as set forth in claim 1, wherein two of the annular bodies are respectively arranged at opposite ends of the rotor core in the stacking direction, and at least one of the two annular bodies has a smaller thickness than the annular bodies other than the two annular bodies.

3. The rotor as set forth in claim 1, wherein the number of the core segments in each of the annular bodies is set to an integer that is a divisor of k and less than or equal to k/2.

4. The rotor as set forth in claim 1, wherein for all the annular bodies, every two annular bodies adjacent to each other in the stacking direction are circumferential offset from each other.

5. The rotor as set forth in claim 1, wherein the gap is formed between adjacent two of the magnetic poles.

6. The rotor as set forth in claim 1, wherein each of the core segments has an opposite pair of circumferential end surfaces,
   for each adjacent pair of the circumferential end surfaces of the core segments, one of the circumferential end surfaces of the pair has a protrusion formed thereon, and the other circumferential end surface has a recess formed therein, and
   the protrusion is fitted in the recess, keeping the gap between the two circumferential end surfaces.

7. The rotor as set forth in claim 1, wherein each of the fixing members has a pair of end portions protruding outside the corresponding through-hole of the rotor core respectively on opposite sides of the corresponding through-hole in the stacking direction, and at least one of the end portions is upset so as to fix the rotor core to the fixed member.

8. The rotor as set forth in claim 1, further comprising an annular first plate that is made of a nonmagnetic material and interposed between one adjacent pair of the annular bodies in the stacking direction.

9. The rotor as set forth in claim 1, further comprising an annular second plate that is arranged on the opposite side of the rotor core to the fixed member so as to have the rotor core interposed between the second plate and the fixed member in the stacking direction, the second plate having a plurality of through-holes each of which is coaxially formed with a corresponding one of the through-holes of the rotor core so as to allow a corresponding one of the fixing members to extend therethrough.

10. The rotor as set forth in claim 9, wherein the second plate has a plurality of window holes each of which is aligned in the stacking direction with a corresponding one of the permanent magnets provided in the rotor core, and each of the window holes is sized so that only part of the corresponding permanent magnet is exposed from the window hole.

11. A rotating electric machine comprising:
   the rotor as set forth in claim 1; and
   a stator disposed in radial opposition to the rotor.

* * * * *